United States Patent
Beall et al.

(10) Patent No.: US 6,531,420 B1
(45) Date of Patent: *Mar. 11, 2003

(54) TRANSPARENT LITHIUM ZINC MAGNESIUM ORTHOSILICATE GLASS-CERAMICS

(75) Inventors: George H. Beall, Big Flats, NY (US); Linda R. Pinckney, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/158,256

(22) Filed: May 29, 2002

Related U.S. Application Data (63) Continuation of application No. 09/686,421, filed on Oct. 11, 2000, now abandoned.
(60) Provisional application No. 60/159,967, filed on Oct. 18, 1999, and provisional application No. 60/174,012, filed on Dec. 30, 1999.

(51) Int. Cl.[7] .......................... C03C 10/04; C09K 11/08; C09K 11/59
(52) U.S. Cl. ............. 501/5; 252/301.4 R; 252/301.6 R; 65/33.1
(58) Field of Search ....................... 501/5; 252/301.4 R, 252/301.6 R; 65/33.1

(56) References Cited

U.S. PATENT DOCUMENTS

| | | | |
|---|---|---|---|
| 4,714,687 A | 12/1987 | Holleran et al. | 501/9 |
| 6,120,906 A | 9/2000 | Terashi | 428/426 |
| 6,300,262 B1 | 10/2001 | Beall | 501/5 |
| 6,303,527 B1 | 10/2001 | Pinckney | 501/5 |

*Primary Examiner*—Karl Group
(74) *Attorney, Agent, or Firm*—Vincent T. Kung (57) ABSTRACT

A glass-ceramic which is substantially and desirably totally transparent, and which contains a predominant, orthosilicate crystal phase whose composition lies within the ternary $Mg_2SiO_4$—$Zn_2SiO_4$—$Li_4SiO_4$ system. The glass-ceramic is formed from precursor glasses having the following compositions, in weight percent on an oxide basis: 35–72 $SiO_2$, 0–20 $Al_2O_3$, 0–40 ZnO, 0–18 MgO, 1–15 $Li_2O$, 0–18 $K_2O$, 0–8 $Na_2O$, 0–8 $P_2O_5$, with the condition that $\Sigma ZnO+MgO \geq 7$. The glass-ceramic may be doped with up to 1 wt. % chromium, oxide to impart optical activity thereto.

9 Claims, 6 Drawing Sheets

TRANSPARENT LITHIUM ZINC MAGNESIUM ORTHOSILICATE GLASS-CERAMICS

CROSS-REFERENCE TO RELATED APPLICATIONS

This Application claims benefit of priority of U.S. Provisional Application No. 60/159,967, filed on Oct. 18, 1999, and of Supplemental Provisional Application No. 60/174,012, filed on Dec. 30, 1999, and is a continuation of, U.S. application Ser. No. 09/686,421, abandoned, entitled "TRANSPARENT LITHIUM ZINC MAGNESIUM ORTHOSILICATE GLASS-CERAMICS," filed in the names of George H. Beall and Linda R. Pinckney, on Oct. 11, 2000.

An application entitled TRANSITION-METAL GLASS-CERAMIC GAIN MEDIA, filed as U.S. Provisional Application Serial No. 60/160,053 on Oct. 18, 1999, in the names of George H. Beall and Linda R. Pinckney and assigned to the same assignee as this application, is directed to transition-metal doped, glass ceramic materials that exhibit properties that make them suitable as gain media for use in optical amplifiers and/or laser pumps.

An application entitled TRANSPARENT GLASS-CERAMICS BASED ON ALPHA- AND BETA-WILLEMITE, filed as a U.S. Provisional Application Serial No. 60/160,138 on Oct. 18, 1999, in the name of Linda R. Pinckney, and assigned to the same assignee as this application, is directed to a substantially transparent, alpha- and beta-willemite glass-ceramic which may be doped with transition-metals to impart optical activity thereto.

An application entitled TRANSPARENT FORSTERITE GLASS-CERAMICS, filed as a U.S. Provisional Application Serial No. 60/160,093 on Oct. 18, 1999, in the name of George H. Beall, and assigned to the same assignee as this application, is directed to a substantially transparent, forsterite glass-ceramic which may be doped with transition-metals to impart optical activity thereto.

An application entitled GLASS-CERAMIC FIBER AND METHOD, filed as U.S. Provisional Application Serial No. 60/160,052 on Oct. 18, 1999 in the names of George H. Beall, Linda R. Pinckney, William Vockroth and Ji Wang and assigned to the same assignee as this application, is directed to glass-ceramic materials containing nanocrystals and being doped with a transition metal, and to a method of producing such glass-ceramics in the form of optical fibers.

FIELD OF THE INVENTION

The present invention relates to transparent glass ceramics, in particular, to substantially transparent glass-ceramics based on orthosilicate crystals of various polymorphs within the ternary $Mg_2SiO_4$—$Zn_2SiO_4$—$Li_4SiO_4$ system.

BACKGROUND OF THE INVENTION

Glass-ceramics are polycrystalline materials formed by a controlled crystallization of a precursor glass. The method for producing such glass-ceramics customarily involves three fundamental steps: first, a glass-forming batch is melted; second, the melt is simultaneously cooled to a temperature at least below the transformation range thereof and a glass body of a desired geometry shaped therefrom; and third, the glass body is heated to a temperature above the transformation range of the glass in a controlled manner to generate crystals in situ.

Frequently, the glass body is exposed to a two-stage treatment. Hence, the glass will be heated initially to a temperature within, or somewhat above, the transformation range for a period of time sufficient to cause the development of nuclei in the glass. Thereafter, the temperature will be raised to levels approaching, or even exceeding, the softening point of the glass to cause the growth of crystals on the previously-formed nuclei. The resultant crystals are commonly more uniformly fine-grained and the articles are typically more highly crystalline. Internal nucleation allows glass-ceramics to possess such favorable qualities as a very narrow, particle size distribution and highly uniform dispersion throughout the glass host.

Transparent glass-ceramics are well known to the art; the classic study thereof being authored by G. H. Beall and D. A. Duke in "Transparent Glass-Ceramics", *Journal of Materials Science*, 4, pp. 340–352 (1969). Glass-ceramic bodies will display transparency to the human eye when the crystals present therein are considerably smaller than the wavelength of visible light. More specifically, transparency generally results from crystals less than 50 nm, and preferably as low as 10 nm in size.

Recently, much effort has been concentrated in the area of using transparent glass-ceramics as hosts for transition metals which act as optically active dopants. Suitable glass-ceramic hosts must be tailored such that transition elements will preferentially partition into the crystals. Co-pending Provisional Application Serial No. 60/160,053 entitled "Transition Metal Glass-Ceramics" by Beall et al., co-assigned to the present assignee, and herein incorporated by reference in its entirety, is directed to transition-metal doped glass-ceramics suitable for formation of a telecommunications gain or pump laser fiber.

Transparent glass-ceramics which contain relatively small numbers of crystals can be of great use in cases where the parent glass provides an easy-to-melt or an-easy-to-form vehicle for a crystal. The crystal in itself, may be difficult or expensive to synthesize, but provides highly desirable features, such as optical activity. The crystals in the glass-ceramic are generally oriented randomly throughout the bulk of the glass, unlike a single crystal which has a specific orientation. Random orientation, and consequent anisotropy, are advantageous for many applications. One example is that of optical amplifiers, where polarization-independent gain is imperative.

Transparent glass-ceramics doped with transition elements can combine the optical efficiency of crystals with the forming flexibility of glass. For example, both bulk (planar) and fiber forms can be fabricated from these glass-ceramics.

Therefore, there exists a need for transparent, glass-ceramic materials which contain small tetrahedral and interstitial sites, and hence are suitable as potentially valuable hosts for small, optically active transition elements. Such elements include, but are not limited to, $Cr^{4+}$, $Cr^{3+}$, $Co^{2+}$, $Cu^{2+}$, $Ni^{2+}$, $Mn^{2+}$, $Fe^{3+}$, $Fe^{2+}$, and $Cu^+$. These elements impart luminescence and fluorescence thereto, yielding doped, glass-ceramic materials suitable for application in the optical field industry.

Numerous crystal phases, comprising multiple polymorphs and wide ranges of solid solution, occur within the composition field defined by $Mg_2SiO_4$—$Zn_2SiO_4$—$Li_4SiO_4$. These crystal phases have unique crystal structures that are distinct from the crystal structures of the end members $Mg_2SiO_4$ (Forsterite), $Zn_2SiO_4$ (Willemite), and $Li_4SiO_4$. The crystal structures are based on hexagonal close-packed arrays of oxygen atoms, with all the metal ions (i.e., $Zn^{2+}$, $Mg^{2+}$, and $Li^+$) in tetrahedral coordination. Different distributions of cations over the tetrahedral sites give rise to numerous polymorphs which in turn are classified as β- and γ-type structures. The linkage of the tetrahedra in the β-type structures is such that each tetrahedron shares each of its corners with three other tetrahedra, whereas in the closely-related γ-type structures some tetrahedral edge sharing occurs as well. The crystal structures are not well characterized, but they display orthorhombic or pseudo-orthorhombic (monoclinic) symmetry.

While many of these phases and their stability fields have been described in phase equilibria and mineralogical literature, no transparent glass-ceramics based on crystals within the ternary $Mg_2SiO_4$—$Zn_2SiO_4$—$Li_4SiO_4$ system have ever been fabricated.

Accordingly, the primary object of the present invention is to provide glass-ceramic materials which are substantially and desirably totally transparent, and which contain a predominant, orthosilicate crystal phase whose composition lies within the ternary $Mg_2SiO_4$—$Zn_2SiO_4$—$Li_4SiO_4$ system.

Another object of the present invention is to provide such orthosilicate glass-ceramics that are capable of being doped with ingredients which confer luminescence and/or fluorescence thereto.

An important advantage of the present glass-ceramic family is that it provides a material containing orthosilicate crystals which contain tetrahedrally-coordinated sites into which there is partitioning of transition metal ions including, but not limited to, $Cr^{4+}$, $Cr^{3+}$, $Co^{2+}$, $Cu^{2+}$, $Ni^{2+}$, $Mn^{2+}$, $Fe^{3+}$, $Fe^{2+}$, and $Cu^+$. The material is glass-based thus providing an important flexibility that allows for fabrication of both bulk (such as planar substrates) and fiber (such as optical fiber) forms.

Other objects and advantages of the present invention will be apparent from the following description.

BRIEF SUMMARY OF THE INVENTION

In accordance with the present invention, there is provided a, substantially transparent, orthosilicate glass-ceramic whose crystal composition lies within the ternary $Mg_2SiO_4$—$Zn_2SiO_4$—$Li_4SiO_4$ system. The inventive glass-ceramic is formed from precursor glasses having the following compositions, in weight percent on an oxide basis: 35–72 $SiO_2$, 0–25 $Al_2O_3$, 0–40 ZnO, 0–18 MgO, 1–15 $Li_2O$, 0–18 $K_2O$, 0–8 $Na_2O$, 0–8 $P_2O_5$, with the condition that $\Sigma ZnO+MgO \geq 7$.

To obtain the greatest degree of transparency in the final glass-ceramic article, the most preferred compositions in the $Mg_2SiO_4$—$Zn_2SiO_4$—$Li_4SiO_4$ system will consist essentially, expressed in terms of weight percent on the oxide basis, of 40–65 $SiO_2$, 5–18 $Al_2O_3$, 8–36 ZnO, 0–12 MgO, 1–12 $Li_2O$, 8–14 $K_2O$, 0–5 $Na_2O$, 0–6 $P_2O_5$, with the condition that $\Sigma ZnO+MgO \geq 10$.

One method of obtaining optical activity in the present inventive orthosilicate glass-ceramic materials, i.e., fluorescence, over the communications transmission wavelength range of 1100 to 1700 nm, is to dope the glass-ceramic material with up to about 1 wt. % chromium oxide and preferably with about 0.003–0.3 wt. %.

A method of making the inventive glass-ceramic is also provided comprising the steps of:

a.) melting a batch for a glass having a composition consisting essentially, in weight percent on an oxide basis, of 35–72 $SiO_2$, 0–25 $Al_2O_3$, 0–40 ZnO, 0–18 MgO, 1–15 $Li_2O$, 0–18 $K_2O$, 0–8 $Na_2O$, 0–8 $P_2O_5$, with the condition that $\Sigma ZnO+MgO \geq 7$;

b.) cooling the glass to a temperature at least below the transformation range of the glass;

c.) exposing the glass to a temperature between about 550–950° C. for a period of time sufficient to cause the generation of a glass-ceramic which is substantially transparent and which contains a predominant, orthosilicate crystal phase within the ternary $Mg_2SiO_4$—$Zn_2SiO_4$—$Li_4SiO_4$ system; and, d.) cooling the glass-ceramic to room temperature.

DETAILED DESCRIPTION OF THE INVENTION

The compositions of the present inventive, substantially transparent, orthosilicate glass-ceramics consist essentially, in weight percent on an oxide basis, of

| | |
|---|---|
| $SiO_2$ | 35–72 |
| $Al_2O_3$ | 0–25 |
| ZnO | 0–40 |
| MgO | 0–18 |
| $\Sigma$ ZnO + MgO | $\geq 7$ |
| $Li_2O$ | 1–15 |
| $K_2O$ | 0–18 |
| $Na_2O$ | 0–8 |
| $P_2O_5$ | 0–8. |

Up to 5% CaO, BaO, PbO, or SrO or up to 20% $Ga_2O_3$ or $GeO_2$ may also be added.

To obtain the greatest degree of transparency in the final glass-ceramic article, the most preferred composition range is based on a composition consisting essentially, in weight percent on an oxide basis, of

| | |
|---|---|
| $SiO_2$ | 40–65 |
| $Al_2O_3$ | 5–18 |
| ZnO | 8–36 |
| MgO | 0–12 |
| $\Sigma$ ZnO+MgO | $\geq 10$ |
| $Li_2O$ | 8–14 |
| $K_2O$ | 0–5 |
| $Na_2O$ | 0–5 |
| $P_2O_5$ | 0–6. |

The following Table sets forth a number of glass compositions, expressed in terms of parts by weight on the oxide basis, illustrating the parameters of the present invention. The Table also presents the ceramming schedule in °C. and hours, as well as the degree of transparency observed in each resulting glass-ceramic material. Transparency is rated from 1 (translucent) to 4 (water-white transparency) for samples 5–10 mm thick.

Inasmuch as the sum of the individual components in each recited glass approximates 100, for all practical purposes the tabulated values may be deemed to reflect weight percent. The batch ingredients for preparing glasses falling within the inventive composition ranges may comprise any materials, either the oxides or other compounds, which, upon being melted together, will be converted into the desired oxide in the proper proportions.

lithia-rich lithium-zinc-silicate glasses. It likely forms a crystalline phosphate phase which then nucleates an isostructural silicate. It is believed that phosphate serves as an effective nucleating agent for the present orthosilicate

TABLE

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| $SiO_2$ | 41.9 | 47.1 | 45.5 | 44.8 | 40.1 | 40.0 | 49.5 | 43.9 | 51.6 | 48.2 | 49.0 | 50.0 | 43.0 | 46.3 | 42.1 | 53.4 |
| $Al_2O_3$ | 11.7 | 14.0 | 14.0 | 14.0 | 11.3 | 12.0 | 14.5 | 11.7 | 14.1 | 16.0 | 16.0 | 16.0 | 11.7 | 14.0 | 11.7 | 9.4 |
| ZnO | 34.0 | 19.0 | 24.1 | 26.6 | 31.8 | 36.0 | | 26.6 | | 12.7 | 8.6 | 4.3 | 30.1 | 21.6 | 29.2 | 27.2 |
| MgO | | | | | 4.5 | | 10.3 | 3.1 | 12.4 | | 3.0 | 6.0 | | | 4.0 | |
| $Li_2O$ | 1.7 | 7.0 | 3.5 | 1.7 | 1.7 | 2.5 | 7.6 | 4.0 | 9.2 | 5.8 | 6.1 | 6.4 | 4.4 | 5.2 | 2.3 | 1.4 |
| $K_2O$ | 10.7 | 12.9 | 12.9 | 12.9 | 10.6 | 9.5 | 13.3 | 10.7 | 12.9 | 14.6 | 14.6 | 14.6 | 10.8 | 12.9 | 10.7 | 8.6 |
| $Na_2O$ | | | | | | | | | | | | | | | | |
| $TiO_2$ | | | | | | | 4.8 | 2.7 | 2.7 | | | | 2.7 | 2.7 | 2.7 | |
| $ZrO_2$ | | | | | | | | | | | | | | | | |
| $P_2O_5$ | | | | | | | | | | | | | | | | |
| °C.-hr | 750-2 | 750-2 | 750-2 | 750-2 | 750-2 | 750-2 | 750-2 | 750-2 | 750-2 | 600-1 | 600-1 | 600-1 | 650-1 | 650-1 | 650-1 | 650-1 |
| Glass-Ceramic Transparency | 4 | 2 | 2 | 3 | 4 | 4 | 2 | 2 | 2 | 4 | 4 | 3 | 2 | 2 | 2 | 3 |

| | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| $SiO_2$ | 45.5 | 52.3 | 49.0 | 53.6 | 54.4 | 61.3 | 67.2 | 65.3 | 56.0 | 58.3 | 61.3 | 61.5 | 60.5 | 63.0 | 64.5 | 63.2 |
| $Al_2O_3$ | 14.0 | 14.4 | 14.3 | 13.9 | 14.1 | 12.8 | 13.0 | 13.9 | | 1.6 | 12.8 | 7.8 | 7.7 | 8.0 | 8.2 | 8.0 |
| ZnO | 23.5 | | | 17.2 | 16.8 | 13.9 | 9.1 | 9.7 | 30.2 | 26.6 | 13.9 | 18.6 | 20.9 | 19.0 | 12.7 | 13.4 |
| MgO | | 12.4 | 10.2 | | | | | | | | | | | | | 2.9 |
| $Li_2O$ | 4.0 | 9.2 | 7.5 | 9.0 | 9.0 | 7.9 | 7.3 | 7.7 | 10.3 | 9.5 | 7.9 | 8.0 | 6.9 | 9.2 | 10.9 | 8.2 |
| $K_2O$ | 13.0 | 8.6 | 13.2 | | | | | | | | | | | | | |
| $Na_2O$ | | 3.1 | | | | | | | | | | | | | | |
| $TiO_2$ | | | 2.8 | | | | | | | | | | | | | |
| $ZrO_2$ | | | 2.8 | | | | | | | | | | | | | |
| $P_2O_5$ | | | | 6.4 | 5.7 | 4.1 | 3.4 | 3.4 | 3.5 | 4.0 | 4.1 | 4.1 | 4.0 | 3.8 | 2.8 | 4.3 |
| °C.-hr | 650-1 | 725-2 | 725-1 | 650-2 750-4 | 650-2 700-4 | 650-2 700-4 | 650-2 700-4 | 650-2 700-4 | 575-2 650-4 | 575-2 700-4 | 650-2 700-4 | 650-2 750-4 | 700-2 750-4 | 600-2 750-4 | 600-2 650-4 | 600-4 | 600-2 |
| Glass-Ceramic Transparency | 3 | 2 | 4 | 1 | 3 | 4 | 4 | 2 | 1 | 2 | 3 | 2 | 4 | 4 | 4 | 3 |

The exemplary glasses were produced in the following manner. The batch materials were compounded, mixed together to assist in achieving a homogeneous melt, and then placed into platinum crucibles. The crucibles were introduced into a furnace operating at temperatures of 1400–1600° C., and the batches were melted for 4–16 hours. The melt was poured as free "patties" (5–10 mm thick) which were thereafter transferred to an annealer operating at about 550–600° C.

The glass patties were subjected to a ceramming cycle by placing them into a furnace and subjecting them to a heat treatment according to the following schedule: 300° C./hour to a crystallization temperature T°C., hold at T°C. for 1–2 hours, and cool at furnace rate. The crystallization temperature T varied from 550–950° C., such that a substantially transparent orthosilicate glass-ceramic is obtained. In another ceramming cycle, the samples are first heat treated to a temperature between 575–700° C., with a hold of 1–2 hours, followed by treatment at about 650–750° C., with a hold of about 4 hours, such that a substantially transparent orthosilicate glass-ceramic is obtained.

The inventive compositions are self-nucleating due to liquid-liquid phase separation and therefore require no added nucleating agents. More specifically, nucleation is promoted by amorphous phase separation. However, even though nucleating agents are not required, in many cases the addition of nucleating agents such as $TiO_2$, $ZrO_2$, and $P_2O_5$, results in a finer crystal size and improved transparency. Examples of compositions that are nucleated with $TiO_2$, $TiO_2+ZrO_2$, and $P_2O_5$ are given in the Table. Phosphorous pentoxide, $P_2O_5$, has been widely used in the art as a nucleating agent in the crystallization of lithia-silica and phases in the present inventive glass-ceramics because the polymorphs are isotypic with β and γ polymorphs of $Li_3PO_4$.

Figure 1:
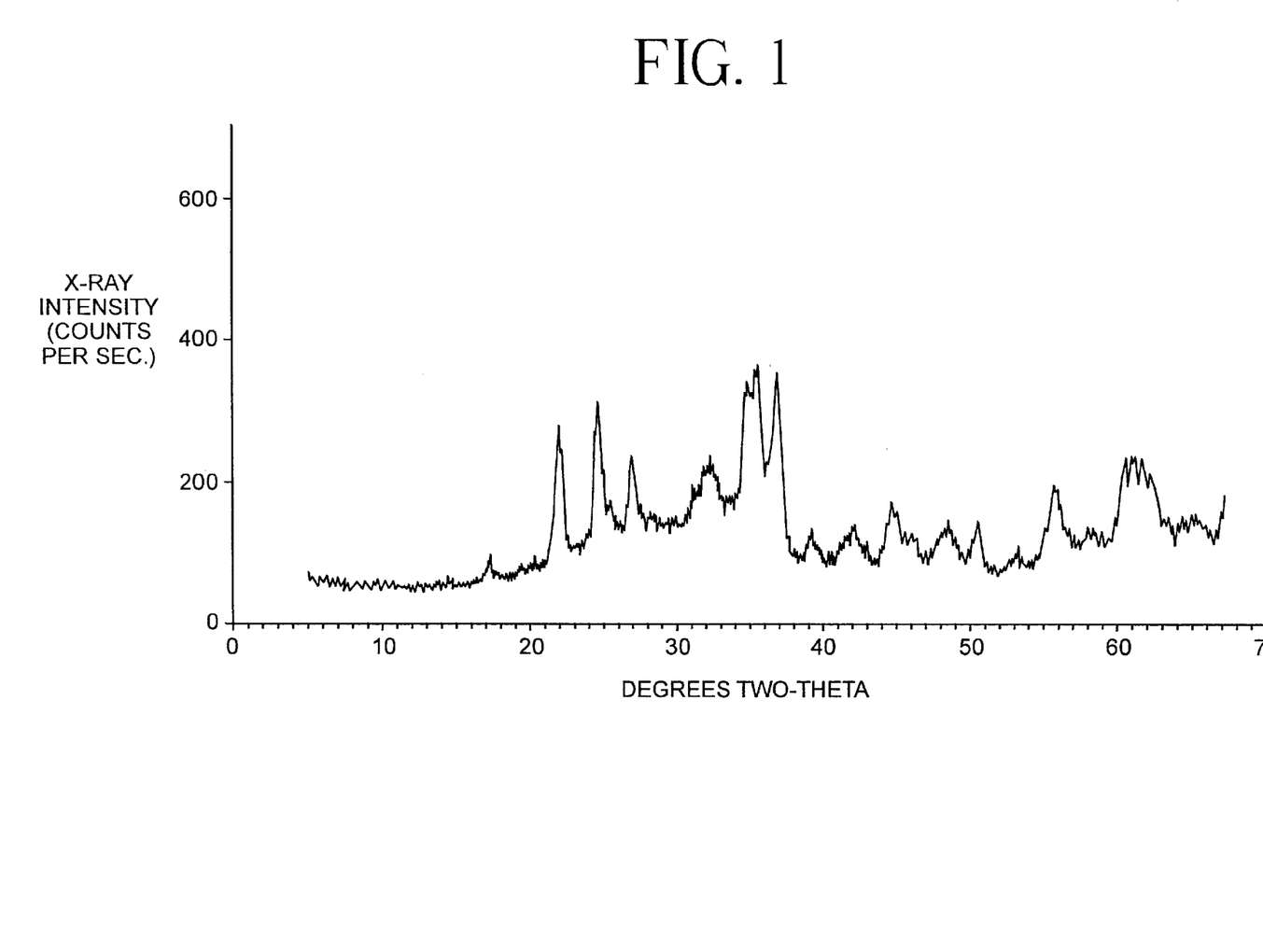
FIGS. 1, 2 and 3 are powder X-ray diffraction spectra of the glass-ceramics of Examples 1, 10 and 17, respectively, in the composition TABLE, infra.
Figure 2:
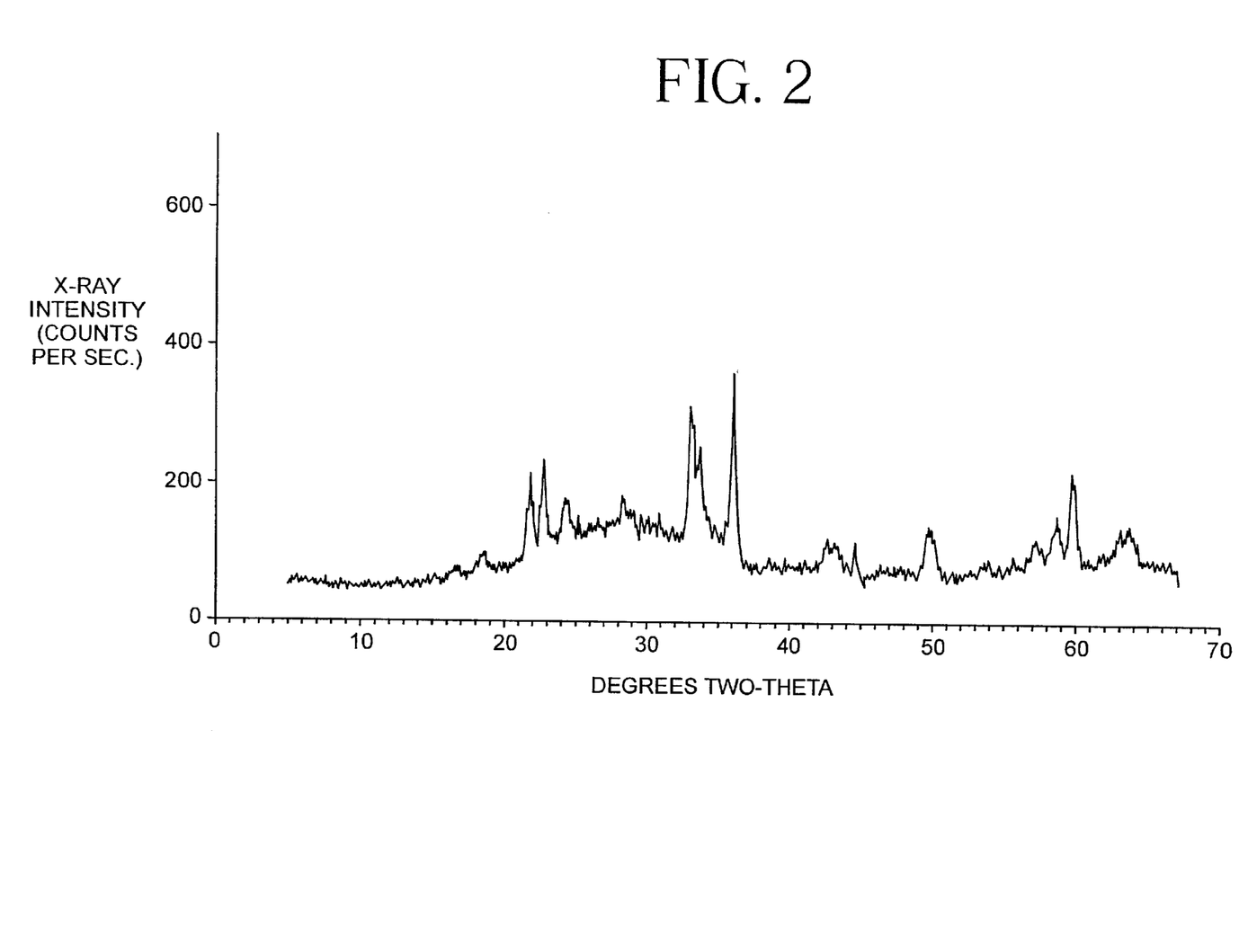
Figure 3:
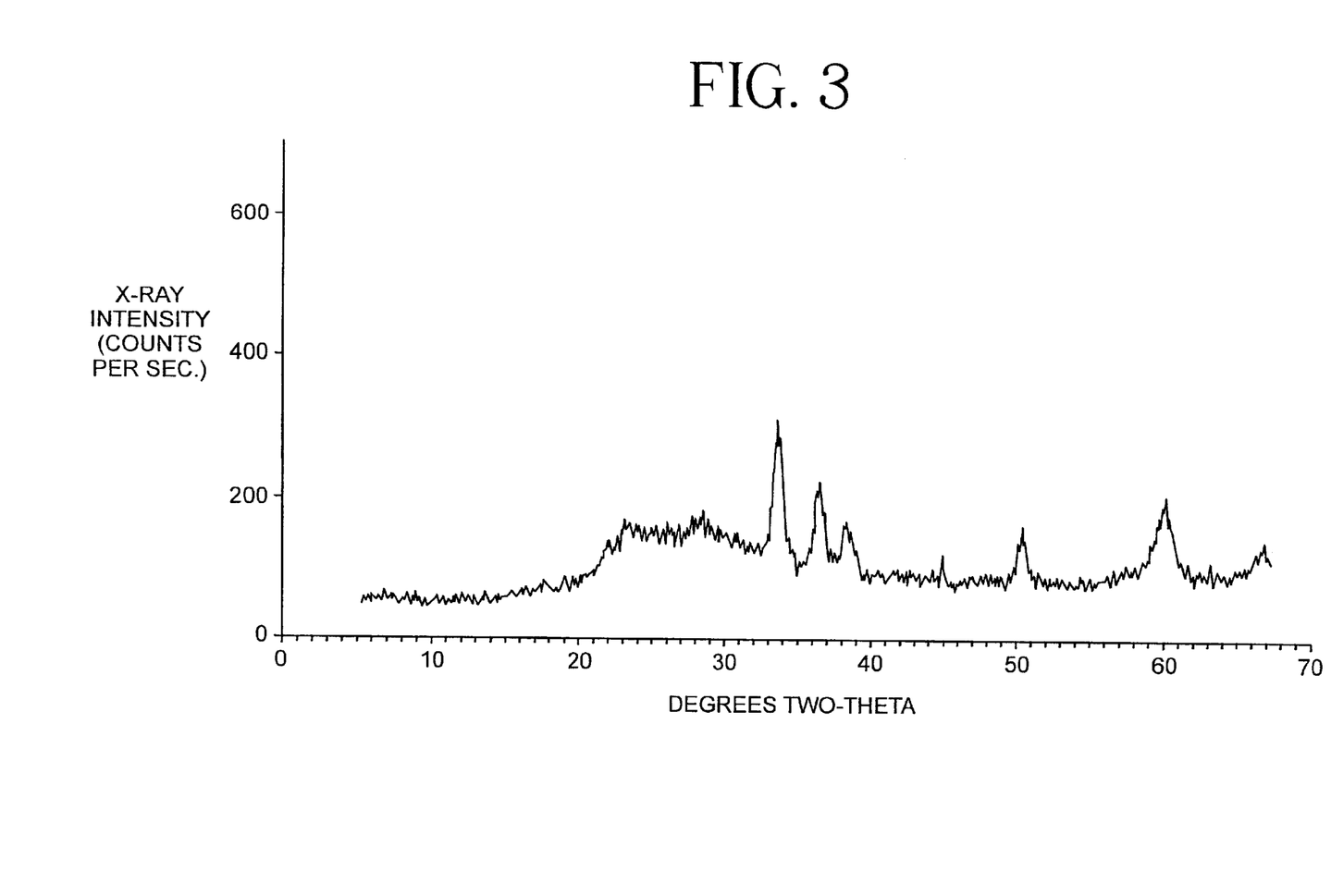

The crystalline phases of the resulting glass-ceramic materials were identified using X-ray powder diffraction. Representative diffraction patterns are shown in FIGS. 1, 2 and 3 for Examples 1, 10 and 17 respectively.

In the inventive glass-ceramics, transparency is a function of the microstructure which in turn is a function of the composition and heat treatment. The microstructure of the inventive glass-ceramics contains orthosilicate microcrystals (of about 10–50 nm in size) in a stable silicate or alkali aluminosilicate glass, with total crystallinity ranging from about 10% to 50% by volume depending on individual compositions. The orthosilicate microcrystals which make-up the crystalline phase are internally grown in the base glass during the ceramming cycle.

The orthosilicate crystal structure provides only small tetrahedral and interstitial sites. This feature renders the microcrystals potentially valuable hosts for small, optically active transition elements including, but not limited to, $Cr^{4+}$, $Cr^{3+}$, $Co^{2+}$, $Cu^{2+}$, $Ni^{2+}$, $Mn^{2+}$, $Fe^{3+}$, $Fe^{2+}$, and $Cu^+$. More specifically, the minor crystal phase concentrates such transition metal ions into tetrahedrally-coordinated sites to provide optical activity. As known in the optics and laser art, crystals with tetrahedrally-coordinated $Cr^{4+}$ ions provide unique optical characteristics. Therefore, in one possible application, the present inventive transparent orthosilicate glass-ceramics doped with transition metal ions, are suitable for employment in the optics and laser industries. Specific applications include, but are not limited to, optical amplifiers and pump lasers.

Figure 4:
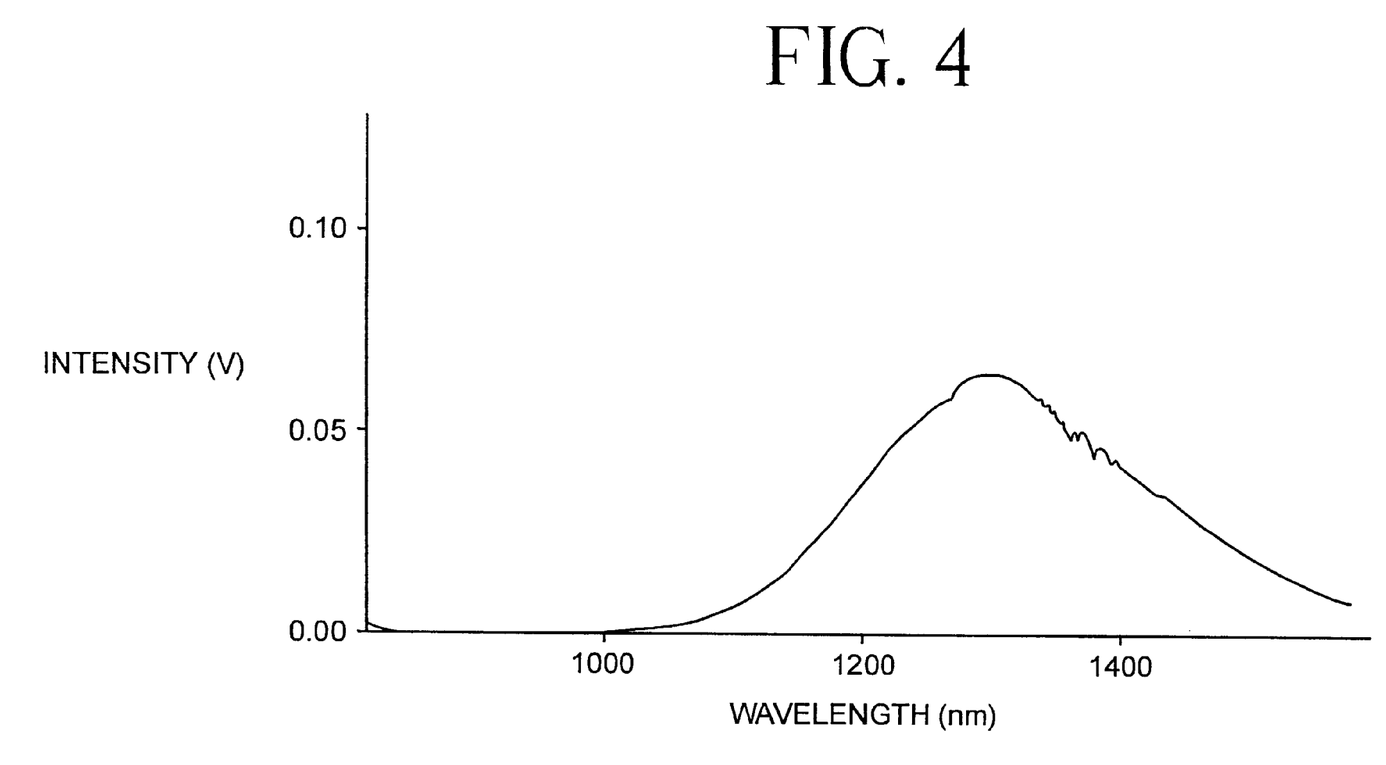
FIGS. 4, 5 and 6 show the fluorescence curves for the glass-ceramics of Example 1, 10 and 17, respectively, in the TABLE, infra, when doped with $Cr^{4+}$.
Figure 5:
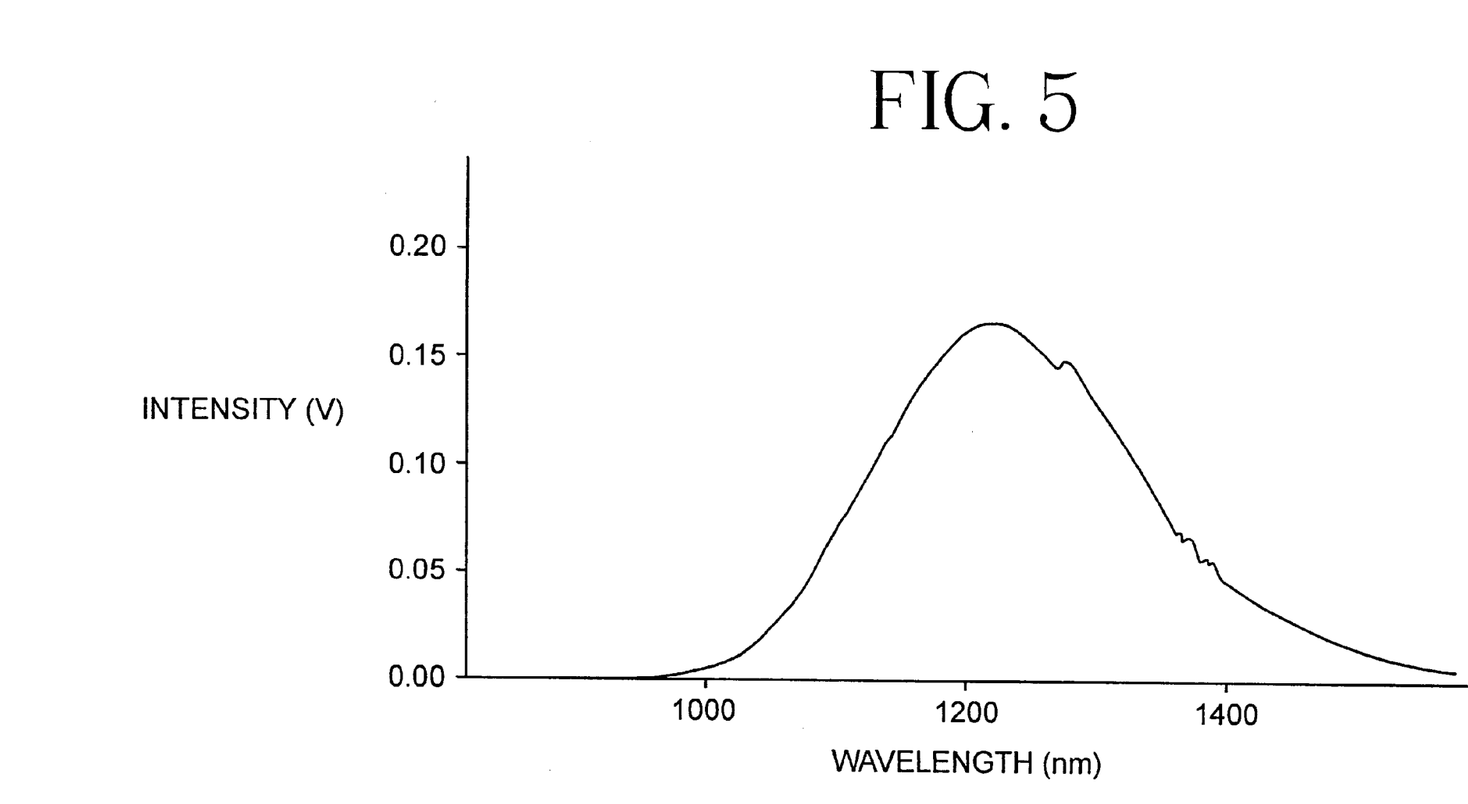
Figure 6:
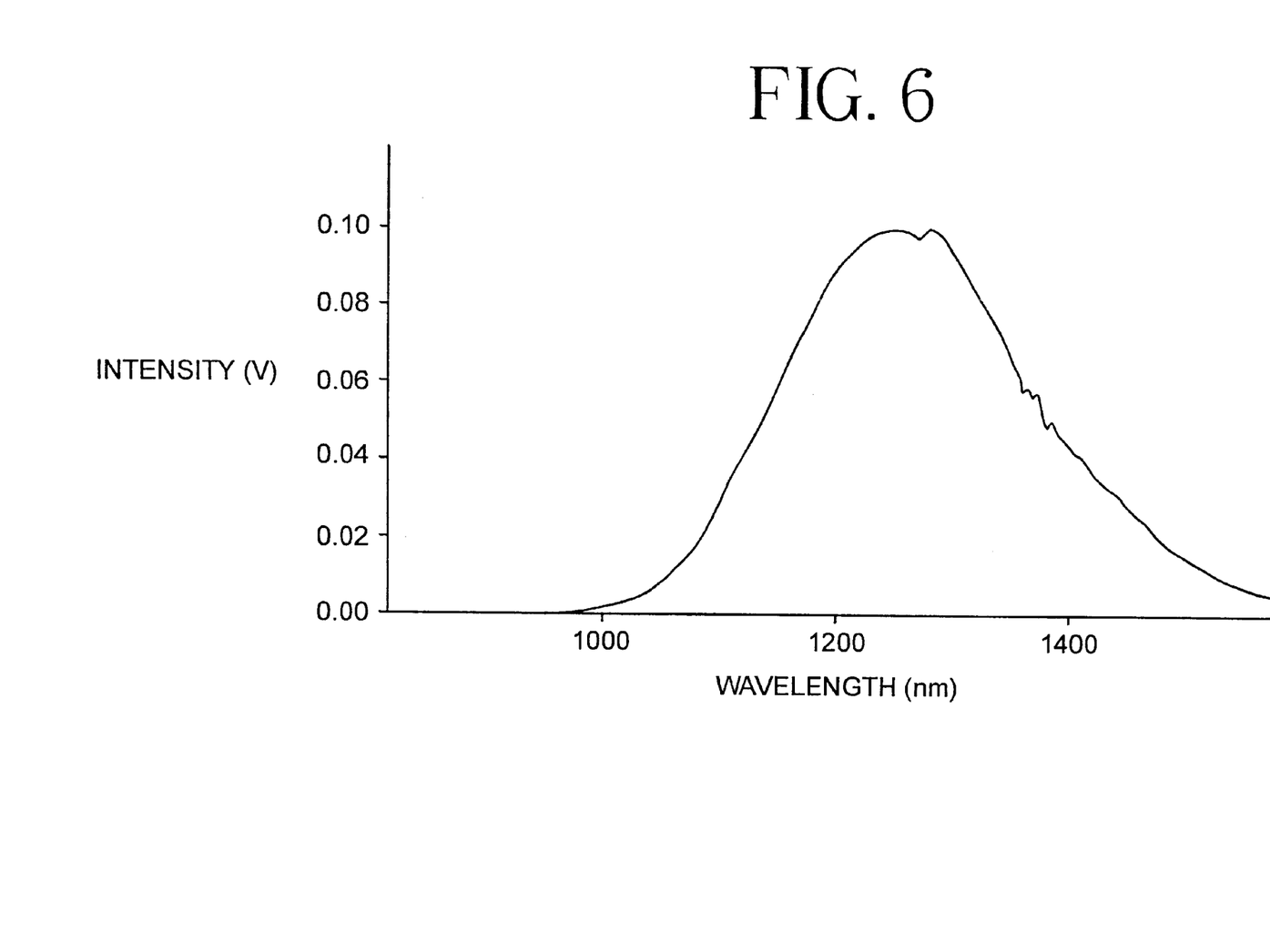

In laboratory experiments, Examples 1, 7 and 10 were doped with 0.06 wt. % chromium oxide and fluorescence measurements were taken. As shown in FIGS. 4, 5 and 6, strong $Cr^{4+}$ emission was observed over the communications transmission wavelength range between 1100–1700 nm.

Although the present invention has been fully described by way of examples, it is to be noted that various changes and modifications will be apparent to those skilled in the art. Therefore, unless otherwise such changes and modifications depart from the scope of the present invention, they should be construed as included therein.

What is claimed is:

1. A substantially transparent glass-ceramic containing an orthosilicate crystal phase whose composition lies within the ternary $Mg_2SiO_4$—$Zn_2SiO_4$—$Li_4SiO_4$ system and consists essentially, in weight percent on an oxide basis, of

| | |
|---|---|
| $SiO_2$ | 35–72 |
| $Al_2O_3$ | 0–25 |
| ZnO | 0–40 |
| MgO | 0–18 |
| Σ ZnO + MgO | ≧7 |
| $Li_2O$ | 1–15 |
| $K_2O$ | 0–18 |
| $Na_2O$ | 0–8 |
| $P_2O_5$ | 0–8. |

2. The glass-ceramic of claim 1 wherein said composition further includes, in weight percent on an oxide basis, up to 1 wt. % chromium oxide.

3. The glass-ceramic claim 2 wherein said composition contains 0.003–0.3 wt. % chromium oxide.

4. The glass-ceramic of claim 1 wherein said orthosilicate crystal phase concentrates transition metal ions selected from the group consisting of $Cr^{4+}$, $Cr^{3+}$, $Co^{2+}$, $Cu^{2+}$, $Ni^{2+}$, $Mn^{2+}$, $Fe^{3+}$, $Fe^{2+}$, and $Cu^+$ into tetrahedrally-coordinated or small interstitial sites whereby optical activity is obtained in said glass-ceramic.

5. A method of making a substantially transparent glass-ceramic containing an orthosilicate crystal phase whose composition lies within the ternary $Mg_2SiO_4$—$Zn_2SiO_4$—$Li_4SiO_4$ system, the method comprising the steps of:

a.) melting a batch for a glass having a composition consisting essentially, in weight percent on an oxide basis, of 35–72 $SiO_2$, 0–25 $Al_2O_3$, 0–40 ZnO, 0–18 MgO, 1–15 $Li_2O$, 0–18 $K_2O$, 0–8 $Na_2O$, 0–8 $P_2O_5$, with the condition that $\Sigma ZnO+MgO \geqq 7$;

b.) cooling the glass to a temperature at least below the transformation range of the glass;

c.) exposing the glass to a temperature between about 550–950° C. for a period of time sufficient to cause the generation of a glass-ceramic which is substantially transparent and which contains a predominant, orthosilicate crystal phase whose composition lies within the ternary $Mg_2SiO_4$—$Zn_2SiO_4$—$Li_4SiO_4$ system; and, d.) cooling the glass-ceramic to room temperature.

6. The method of claim 5 wherein said glass is initially exposed to a temperature of about 575–700° C. for about 1–2 hours followed by exposure to a temperature of about 650–750° C. for about 4 hours.

7. The method of claim 5 wherein said glass-ceramic is doped with up to 1 wt. % chromium oxide.

8. The method of claim 7 wherein said glass-ceramic is doped with about 0.003–0.3 wt. % chromium oxide.

9. A product prepared by the method according to claim 5.

* * * * *